United States Patent [19]
Paulus et al.

[11] 4,423,120
[45] Dec. 27, 1983

[54] LAMINATING METHOD AND ARTICLE

[75] Inventors: Manfred Paulus, Pforzheim-Eu.; Norbert Frömel, Eisingen, both of Fed. Rep. of Germany

[73] Assignee: Fr. Kammerer GmbH, Pforzheim, Fed. Rep. of Germany

[21] Appl. No.: 351,734

[22] Filed: Feb. 23, 1982

[30] Foreign Application Priority Data

Feb. 23, 1981 [DE] Fed. Rep. of Germany ....... 3106607

[51] Int. Cl.$^3$ ............................................. B23K 20/04
[52] U.S. Cl. .................................... 428/614; 228/116; 228/117; 228/203; 428/615; 428/678; 428/673
[58] Field of Search ............... 228/115, 116, 117, 203, 228/190, 235; 428/614–615, 607, 940, 673, 678; 148/31.55

[56] References Cited

U.S. PATENT DOCUMENTS

| | | | |
|---|---|---|---|
| 2,390,452 | 12/1945 | Mudge . | |
| 3,495,319 | 2/1970 | Finnegan | 228/117 |
| 3,682,606 | 8/1972 | Anderson et al. | 228/190 X |
| 4,038,041 | 7/1977 | Duvall et al. | 228/117 X |
| 4,122,240 | 10/1978 | Banas et al. | 219/121 EG |
| 4,186,245 | 1/1980 | Gilman | 428/607 X |
| 4,197,146 | 4/1980 | Frischmann | 148/31.55 |
| 4,201,837 | 5/1980 | Lupinski | 148/31.55 |
| 4,224,381 | 9/1980 | Patel et al. | 428/928 |
| 4,250,229 | 2/1981 | Kear | 426/606 |

FOREIGN PATENT DOCUMENTS

| | | | |
|---|---|---|---|
| 152499 | 1/1952 | Australia | 228/117 |
| 2805233 | 8/1979 | Fed. Rep. of Germany . | |

*Primary Examiner*—Kenneth J. Ramsey
*Attorney, Agent, or Firm*—Spencer & Frank

[57] ABSTRACT

A method of laminating first and second metal sheets to one another, comprises the steps of superposing the metal sheets and including therebetween a layer of amorphous metal and laminating the sheets to one another. During the lamination a pressure is applied by cold rolling for bonding the first and second sheets together.

22 Claims, 2 Drawing Figures

LAMINATING METHOD AND ARTICLE

BACKGROUND OF THE INVENTION

This invention relates to a plating (laminating) method for making localized or full-surface bonds of conventionally non-laminatable or poorly laminatable materials, particularly by means of lamination by cold rolling.

Conventional laminating methods such as welding by hot-pressing or cold rolling cannot be used for certain combination of materials, since the required strength of adhesion between the materials to be bonded to one another is not achieved. Examples of material combinations which can be only poorly laminated - if at all - with conventional methods are iron-to-silver with welding by hot-pressing and with cold rolling and copper-to-copper with cold rolling. In case of such material pairing the bond has only a very slight adhesion. The materials to be bonded thus separate relatively easily by peeling.

In order to increase the resistance to peeling, it is known to treat the sheet surfaces to be bonded to one another with wire brushes or, particularly in case of aluminum alloys, to coat such surfaces chemically with an oxide layer. In numerous material combinations, however, particularly in the above-listed examples, these measures do not lead to a satisfactory bonding strength.

SUMMARY OF THE INVENTION

It is an object of the invention to provide an improved laminating method which provides, in a technically simple and economical manner, for the manufacture of laminates which conventionally can be bonded to one another only poorly, if at all.

This object and others to become apparent as the specification progresses, are accomplished by the invention, according to which, briefly stated, prior to the laminating step, between the materials to be bonded to one another there is introduced a layer of amorphous metal.

It has been unexpectedly found that the above-noted amorphous metal layer functions as a very effective adhesion agent and effects an inseparable metal bond even in case of the above-specified material pairs.

Tests have shown that as a result of pressing during lamination by cold rolling or cold welding where a thickness reduction of 40 to 80% in one pass is effected, the amorphous metal layer is torn into numerous short lengths since its capability of stretching is negligible as compared to that of the materials to be bonded to one another. Between the lengths of the amorphous metal the materials to be laminated are joined with such a high adhesion that in peeling tests the fracture has been found to propagate in one of the two laminate components rather than along the interface.

It is thus an advantage of the invention that in metal combinations where the components could be laminated only poorly, if at all, an adhesion of such a high strength can be achieved that the laminates may be further processed to form stamped or bent parts. Thus, by virtue of the invention new possibilities of use become available for material combinations which could not be usefully laminated heretofore. Further, the laminating process according to the invention is adapted for material combinations which could be laminated heretofore only with very expensive processes, such as explosion plating or shock-wave plating.

The intermediate amorphous metal layer is expediently an alloy of iron, nickel and/or cobalt with crystallization-delaying additives. Further, copper or palladium alloys may be used. For crystallization-delaying additives mostly boron, silicon, phosphorous, carbon or aluminum are considered. Such alloys have a high-strength elasticity, they are not brittle and are easy to handle.

Advantageously, the thickness of the amorphous intermediate layer is in the order of magnitude of approximately 10 to 50 $\mu$m; it is to be understood, however, that other thicknesses may be appropriate.

The materials to be laminated with the aid of the interposed amorphous layer are reduced in thickness to 40–80% in one pass, for example, by cold rolling or for particular applications by means of presses.

In general, the amorphous intermediate layer is introduced as a thin foil between the two running sheets to be laminated. It is, however, feasible to introduce the amorphous intermediate layer as individual, separate, spaced strips. The laminate components then will bond well to one another only in the zone of the strips, while in the adjacent longitudinal regions they will have a relatively poor adhesion. A product prepared in such a manner can be used for making heat exchangers. In the zone of longitudinally extending areas of relatively poor adhesion the laminate components may be mechanically slightly separated and upset. In this manner, a plurality of spaced channels are provided which may serve as liquid-carrying conduits.

It is within the scope of the invention to apply the amorphous layer on the surface of at least one of the laminate components, rather than to use a separate intermediate layer. According to latest tests conducted, such an amorphous surface layer may be provided by laser treatment of the laminate component, e.g. by an Nd-YAG-Laser with 1.06 $\mu$m wavelength and $5.10^4$ W/cm² absorbed energy. For this purpose palladium-copper-silicon alloys, copper-zirconium alloys or beryllium bronzes are particularly adapted. In this manner, immediately on the surface of a crystalline material a thin amorphous metal layer is provided which, during the subsequent laminating process, functions as an adhesion agent, similarly to a layer of amorphous metal provided separately.

DESCRIPTION OF THE PREFERRED EMBODIMENT

Figure 1:
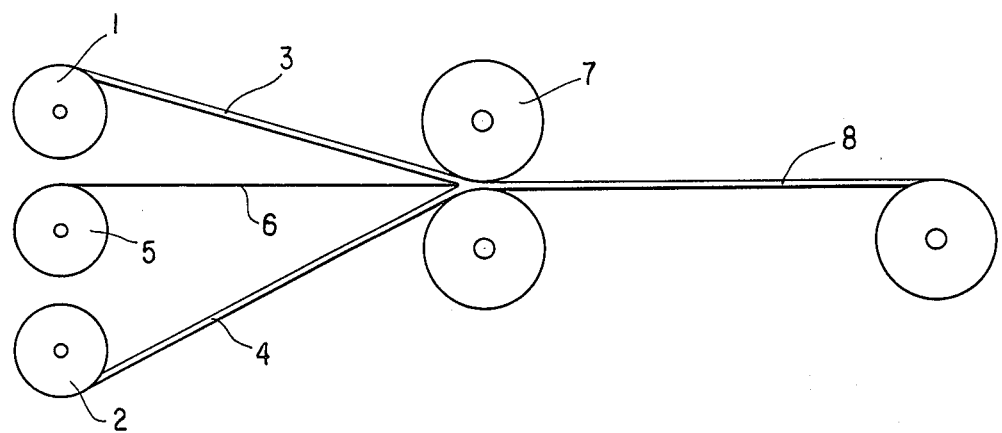
FIG. 1 is a schematic side elevational view of a laminating arrangement for practicing a preferred embodiment of the method according to the invention.

From two supply rolls 1 and 2 metal ribbons 3 and 4 of iron and silver, respectively, are taken off which are to be bonded (laminated) to one another. Between the two rolls 1 and 2 there is arranged a further supply roll 5 carrying an amorphous metal foil 6 of FeNiB. The foil 6 is continuously advanced to a roll pair 7 between the metal sheets 3 and 4. The roll pair 7 effects a cold rolling lamination with a thickness reduction of, for example, 60%.

Figure 2:
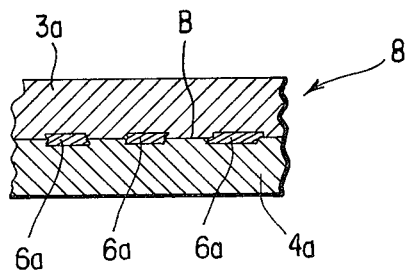
FIG. 2 is a fragmentary sectional view of the finished product shown in FIG. 1, taken in a plane parallel to the drawing plane of FIG. 1.

Turning now to FIG. 2, there is shown in longitudinal section a portion of the laminated product as it emerges from the roll pair 7. The amorphous intermediate layer 6 has been disintegrated into longitudinally spaced lengths 6a. The lengths 6a are situated in the bonding plane B defined by the interface between the two rolled layers 3a and 4a. Thus, there are obtained alternating zones in which portions of the amorphous metal are inserted and zones where the laminating components (the metals 3a and 4a) are in immediate contact with one another. It is in these last-mentioned zones that a superior weld bond between the metals 3a and 4a principally takes place.

It will be understood that the above description of the present invention is susceptible to various changes, modifications and adaptations, and the same are intended to be comprehended within the meaning and range of equivalents of the appended claims.

What is claimed is:

1. A method of laminating first and second metal sheets to one another, comprising the following steps:
   (a) superposing said first and second metal sheets and including therebetween a layer of amorphous metal and
   (b) subsequent to step (a) bonding to one another, by cold rolling, said first and second sheets, whereby said first and second sheets are laminated to one another while the amorphous metal is maintained in the amorphous state.

2. A method as defined in claim 1, wherein the thickness of said layer of amorphous metal is between 10 and 50 μm.

3. A method as defined in claim 1, wherein the step of including said layer of amorphous metal comprises the step of positioning between said first and second sheets said layer having a width substantially equalling that of said first and second sheets.

4. A method as defined in claim 1, wherein the step of including said layer of amorphous metal comprises the step of positioning between said first and second sheets said layer in strips in a side-by-side, spaced arrangement.

5. A method as defined in claim 1, including the step of reducing the overall thickness of said first and second sheets and said amorphous metal layer by 40 to 80%.

6. A method as defined in claim 1, wherein the step of cold rolling includes the step of reducing the overall thickness of said first and second sheets and said amorphous metal layer by 40 to 80%.

7. A method as defined in claim 1, further comprising the step of providing, prior to the superposing step, a surface of at least one of said sheets with said layer of amorphous metal.

8. A method as defined in claim 7, wherein the step of providing the surface of at least one of said sheets with said layer of amorphous metal comprises the step of irradiating said at least one sheet with a laser beam.

9. A method as defined in claim 1, wherein said amorphous metal is an alloy comprising metals selected from the group consisting of iron, nickel and cobalt.

10. A method as defined in claim 9, wherein said alloy includes an additive delaying crystallization.

11. A method as defined in claim 10, wherein said additive is selected from the group consisting of boron, silicon, phosphorous, carbon and aluminum.

12. A laminate product comprising first and second metal sheets being in a superposed relationship and a layer of amorphous metal positioned between said first and second sheets, said product being obtained by a process comprising the following steps:
   (a) superposing said first and second metal sheets and including therebetween a layer of amorphous metal and
   (b) subsequent to step (a) bonding to one another, by cold rolling, said first and second sheets, whereby said first and second sheets are laminated to one another while the amorphous metal is maintained in the amorphous state.

13. A laminate product as defined in claim 12, wherein the thickness of said layer of amorphous metal is between 10 and 50 μm.

14. A laminate product as defined in claim 12, wherein the step of including said layer of amorphous metal comprises the step of positioning between said first and second sheets said layer having a width substantially equalling that of said first and second sheets.

15. A laminate product as defined in claim 12, wherein the step of including said layer of amorphous metal comprises the step of positioning between said first and second sheets said layer in strips in a side-by-side, spaced arrangement.

16. A laminate product as defined in claim 12, including the step of reducing the overall thickness of said first and second sheets and said amorphous metal layer by 40 to 80%.

17. A laminate product as defined in claim 12, further comprising the step of providing, prior to the superposing step, a surface of at least one of said sheets with said layer of amorphous metal.

18. A laminate product as defined in claim 17, wherein the step of providing the surface of at least one of said sheets with said layer of amorphous metal comprises the step of irradiating said at least one sheet with a laser beam.

19. A laminate product as defined in claim 12, wherein said amorphous metal is an alloy comprising metals selected from the group consisting of iron, nickel and cobalt.

20. A laminate product as defined in claim 19, wherein said alloy includes an additive delaying crystallization.

21. A laminate product as defined in claim 20, wherein said additive is selected from the group consisting of boron, silicon, phosphorous, carbon and aluminum.

22. A laminate product as defined in claim 12, wherein the step of cold rolling includes the step of reducing the overall thickness of said first and second sheets and said amorphous metal layer by 40 to 80%.

* * * * *